United States Patent

Roeber et al.

[11] Patent Number: 5,858,492
[45] Date of Patent: Jan. 12, 1999

[54] THERMOPLASTIC MULTILAYER COMPOSITES

[75] Inventors: Stefan Roeber, Hamburg; Hans Ries, Marl, both of Germany

[73] Assignee: Huels Aktiengesellschaft, Marl, Germany

[21] Appl. No.: 610,150

[22] Filed: Feb. 29, 1996

[30] Foreign Application Priority Data

Mar. 1, 1995 [DE] Germany .................. 195 07 026.7

[51] Int. Cl.$^6$ ................ B32B 1/08; B32B 7/12; B32B 27/08; B32B 27/32
[52] U.S. Cl. .............. 428/36.91; 428/36.6; 428/414; 428/421; 428/422; 428/474.4; 428/475.5; 428/475.8; 428/476.1; 428/476.3; 428/476.9; 525/181; 525/182; 138/140; 138/141; 138/145; 138/146; 137/561 R
[58] Field of Search ................. 428/35.7, 35.9, 428/36.6, 36.9, 36.7, 36.91, 421, 422, 414, 474.4, 475.5, 475.8, 476.1, 476.3, 476.9; 525/183, 181, 329.5, 178, 182; 138/140, 141, 145, 146, DIG. 3, 544; 137/561 R, 798

[56] References Cited

U.S. PATENT DOCUMENTS

| | | | |
|---|---|---|---|
| 4,415,706 | 11/1983 | Staas | 525/183 |
| 4,758,455 | 7/1988 | Campbell et al. | 428/36 |
| 4,881,576 | 11/1989 | Kitami et al. | 138/125 |
| 5,258,213 | 11/1993 | Mügge et al. | 428/36.91 |
| 5,313,987 | 5/1994 | Röber et al. | 138/137 |
| 5,330,810 | 7/1994 | Nishino | 428/36.91 |
| 5,362,529 | 11/1994 | Mügge et al. | 428/35.7 |
| 5,362,530 | 11/1994 | Kitami et al. | 428/36.2 |
| 5,362,570 | 11/1994 | Röber et al. | 428/475.2 |
| 5,389,410 | 2/1995 | Mügge et al. | 428/34.1 |
| 5,404,915 | 4/1995 | Mügge et al. | 138/137 |
| 5,425,817 | 6/1995 | Mügge et al. | 138/137 |
| 5,449,024 | 9/1995 | Röber et al. | 138/137 |
| 5,472,784 | 12/1995 | Röber et al. | 428/421 |
| 5,474,822 | 12/1995 | Röber et al. | 428/36.91 |
| 5,478,620 | 12/1995 | Mügge et al. | 428/36.91 |
| 5,500,263 | 3/1996 | Röber et al. | 428/36.6 |
| 5,510,160 | 4/1996 | Jadamus et al. | 428/36.91 |
| 5,512,342 | 4/1996 | Röber et al. | 428/36.91 |
| 5,554,426 | 9/1996 | Rober et al. | 428/36.91 |

FOREIGN PATENT DOCUMENTS

| | | |
|---|---|---|
| 0 464 561 | 1/1992 | European Pat. Off. . |
| 0 523 644 | 1/1993 | European Pat. Off. . |
| 0 618 390 | 10/1994 | European Pat. Off. . |
| 0 637 511 | 2/1995 | European Pat. Off. . |
| 0 649 738 | 4/1995 | European Pat. Off. . |
| 0 649 739 | 4/1995 | European Pat. Off. . |
| 0 650 004 | 4/1995 | European Pat. Off. . |
| WO 94/25524 | 11/1994 | WIPO . |

*Primary Examiner*—Vivian Chen
*Attorney, Agent, or Firm*—Oblon, Spivak, McClelland, Maier & Neustadt, P.C.

[57] ABSTRACT

A composite material having improved thermal and mechanical properties is provided by a thermoplastic multilayer composite consisting at least of (I) a layer of a polyvinylidene fluoride moulding composition, (II) a layer directly adjacent to the layer I, comprising a moulding composition based on a mixture of
 (a) from 40 to 90% by weight of a polyamide, and
 (b) from 10 to 60% by weight of a polyglutarimide, (III) a layer directly adjacent to the layer II comprising a suitable coupling agent, and (IV) a layer directly adjacent to the layer III, comprising a polyolefin moulding composition, with adjacent layers being firmly bonded to one another. By means of the invention it is possible to obtain composite materials having the desired improved property profile.

21 Claims, No Drawings

THERMOPLASTIC MULTILAYER COMPOSITES

BACKGROUND OF THE INVENTION

1. Field of the Invention

The invention relates to thermoplastic multilayer composites having at least one layer, each based on a polyolefin, a polyamide and a polyvinylidene fluoride.

2. Discussion of the Background

Polyolefins, polyvinylidene fluoride and polyamides are each unsuitable for a variety of applications. Although polyamides basically have good mechanical properties, in particular good toughness, for many applications they have poor barrier action. Polar substances can easily migrate through polyamides. This is a problem in the case of fuel lines which carry alcohol-containing fuel.

In contrast, polyvinylidene fluoride has excellent barrier action towards both polar and nonpolar materials. However, a disadvantage of polyvinylidene fluoride is the impact sensitivity. In particular, the notched impact toughness is poor.

Polyolefins have insufficient barrier action towards fuels for a variety of applications. Owning to increased environmental consciousness and the corresponding tightening of legal regulations, single-layer polyolefin pipes cannot be used for transporting of fuels in underground supply lines in petrol stations. Likewise, in the automobile sector, tanks made of polyolefins must be replaced by multilayer tanks having one or more barrier layers, and the various layers must be firmly bonded to each other. However, polyolefins are significantly cheaper than the above-mentioned materials. In addition, the weldability is less problematic. This is a great advantage, particularly for pipes and lines.

Those skilled in the art know that by far the majority of polymers, including polyamide, polyolefins and polyvinylidene fluoride, are incompatible with one another. Sufficient adhesion between the laminated layers is not achieved in the production of multilayer composites. However, a firm bond is absolutely necessary in industrial applications.

Composites of polyamides and polyolefins are known to those skilled in the art. As coupling agents, a series of products are on offer, for example BYNEL® from DuPont and ADMER® from Mitsui. These composites too, are not suitable for many applications owing to unsatisfactory paintability and poor barrier action.

It is an object of the present invention to provide a solvent-resistant and temperature-resistant composite of polyvinylidene fluoride and polyolefins.

It is another object to provide a composite which is insensitive to shear stress and has good mechanical properties.

Another objective is to provide a composite with very good adhesion between layers.

Still another objective is that the composite should be able to be produced by means of coextrusion or pressing.

Still another objective is that the composite can be further processed by means of blow moulding, drawing and thermoforming with retention of the good adhesion between layers.

SUMMARY OF THE INVENTION

These objectives are achieved by a thermoplastic multilayer composite containing at least (I) a layer of a polyvinylidene fluoride moulding composition, (II) a layer directly adjacent to the layer I, comprising a moulding composition based on a mixture of a. polyamide, and b. polyglutarimide, (III) a layer of a suitable coupling agent containing reactive groups, and (IV) a layer directly adjacent to the layer III, comprising a polyolefin moulding composition, with adjacent layers being firmly bonded to one another. The layer IV can also be identical to the layer III.

DETAILED DESCRIPTION OF THE INVENTION

Layer I contains polyvinylidene fluoride, preferably used in plasticizer-free form. Preparation and structure of the polymer are known (Hans R. Kricheldorf, Handbook of Polymer Synthesis, Part A, Marcel Dekker Inc., New York - Basle - Hongkong, p. 101 ff.; Kunststoff-Handbuch, 1st edition, volume XI, Carl Hanser Verlag Munich (1971), p. 403 ff.). This layer can also contain polymers based on polyvinylidene fluoride, with up to 40% by weight of other monomers. Examples of such additional monomers are trifluoroethylene, ethylene, propene and hexafluoropropene. The polyvinylidene fluoride used generally has a melt flow index of <17 g/10 min, preferably from 2 to 13 g/10 min (DIN 53 735).

Suitable components II.a are first and foremost aliphatic homopolyamides and copolyamides. Examples include 4.6-; 6.6-; 6.12-; 8.10-; 10.10-polyamides or the like. Preference is given to 6-; 10.12-; 11-; 12.12- and, in particular, 12-polyamides. (The designation of the polyamides corresponds to the international standard, where the first digit(s) give(s) the number of carbon atoms in the starting diamine and the last digit(s) give(s) the number of carbon atoms in the dicarboxylic acid. If only one number is given, this means that the starting material was an $\alpha,\omega$-aminocarboxylic acid or the lactam derived therefrom—H. Domininghaus, Die Kunststoffe und ihre Eigenschaften, page 272, VDI-Verlag (1976).)

Copolyamides can be used. Examples include copolyamides of adipic acid, sebacic acid, suberic acid, isophthalic acid, and terephthalic acid as co-acid; or bis(4-aminocyclohexyl)methane, trimethylhexamethylenediamine, hexamethylenediamine or the like, as co-diamine.

The preparation of these polyamides is known (e.g. B. D. B. Jacobs, J. Zimmerman, Polymerization Processes, p. 424–467; Interscience Publishers, New York (1977); DE-B 21 52 194).

Other suitable polyamides are mixed aliphatic/aromatic polycondensates. Examples are described in U.S. Pat. Nos. 2,071,250; 2,071,251; 2,130,523; 2,130,948; 2,241,322; 2,312,966; 2,512,606; 3,393,210 or in Kirk-Othmer, Encyclopedia of Chemical Technology, 3rd edition, Vol. 18, Wiley & Sons (1982), pp. 328 and 435. Specific examples include poly(ether ester amides) or poly(etheramides). These are described in DE-A 27 12 987, 25 23 991 or 30 06 961.

The molecular weight (number average) of the polyamides is above 5,000, preferably above 10,000, corresponding to a relative viscosity ($\eta_{rel}$) in the preferred range of from 1.65 to 2.4.

The polyamides of the component II.a can contain up to 40% by weight of other thermoplastics, provided that these do not interfere with the properties according to the invention. Examples include polycarbonate (H. Schnell, Chemistry and Physics of Polycarbonates, Interscience Publishers, New York (1981)), acrylonitrile-styrene-butadiene copolymers (Houben-Weyl, Methoden der organischen Chemie, vol. 14/1, Georg Thieme Verlag Stuttgart, pp. 393–406; Ullmans Encyclopädie der technischen Chemie, 4th edition, vol. 19, Verlag Chemie Weinheim (1981), pp. 279–284), acrylonitrile-styrene-acrylate copolymers (Ullmans Encyclopädie der technischen Chemie, 4th edition, vol. 19, Verlag Chemie Weinheim (1981), pp. 277–295), acrylonitrile-styrene copolymers (Ullmans Encylcopädie der technischen Chemie, 4th edition, vol. 19, Verlag Chemie Weinheim (1981), p. 273 ff) or polyphenylene ethers (DE-A 32 24 691 and 32 24 692, U.S. Pat. Nos. 3,306,874, 3,306,875 and 4,028,341).

If required, the polyamides can be impact modified. Suitable modifiers are, for example, ethylene-propylene or ethylene-propylene-diene copolymers (EP-A-295 076), polypentenylene, polyoctenylene or random or block copolymers of alkenylaromatic compounds with aliphatic olefins or dienes (EP-A-261 748). Furthermore, mention may be made of impact-modifying rubbers: core/shell rubbers having a viscoplastic core of (meth)acrylate, butadiene or styrene-butadiene rubber having glass transition temperatures $T_g < -10°$ C., with the core being able to be crosslinked. The shell can be made up of styrene and/or methyl methacrylate and/or further unsaturated monomers (DE-A 21 44 528, 37 28 685). The proportion of impact-modifying components is to be selected in such a way that the desired properties are not impaired.

Besides polyamide as component II.a the layer II additionally contains the component II.b. Component II.b is made of polyglutarimides, which preferably contain the following basic building blocks:

(i) a maximum of 98.8% by weight, preferably from 10 to 60% by weight, of

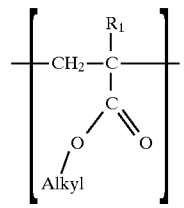

(ii) a maximum of 98.8% by weight, preferably from 30 to 80% by weight, of

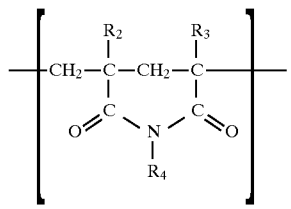

(iii) less than 20% by weight, preferably from 2 to 10% by weight, of

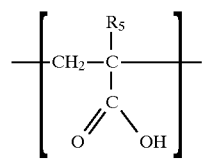

(iv) from 1.2 to 20% by weight, preferably from 1.5 to 12% by weight, particularly preferably from 2 to 10% by weight, of

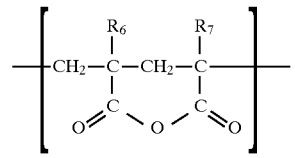

In the specified formulae,
Alkyl=methyl, ethyl, propyl, butyl, pentyl, hexyl; $R_1$ to $R_7=(C_nH_{2n+1})$ where n=0 to 6, where the substituents can be identical or different. Preference is given to those basic building blocks in which Alkyl and $R_1$ to $R_7$ are methyl radicals.

The polymers of the component II.b are described as polyglutarimides because they are poly(alkyl)acrylic esters in which two adjacent carboxylate groups have been reacted to give a cyclic acid imide. The imide formation is preferably carried out using ammonia or primary amines, for example using methylamine. The products and their preparation are known (Hans R. Kricheldorf, Handbook of Polymer Synthesis, Part A, Marcel Dekker Inc., New York - Basle - Hongkong, p. 223 ff; H. G. Elias, Makromoleküle, H üthing and Wepf Verlag Basle - Heidelberg - New York; U.S. Pat. Nos. 2,146,209 and 4,246,374). The polyglutarimides used generally have a melt flow index of <30 g/10 min, preferably from 0.3 to 15 g/10 min.

To increase the low-temperature impact toughness, the polyglutarimides can additionally contain appropriate modifiers. Examples include core/shell polymers having a polybutyl acrylate core and a shell of polymethyl methacrylate and/or polyglutarimide. Apart from the examples mentioned, further modifiers according to the prior art are possible.

The preparation of the moulding composition for the layer II is carried out according to customary and known processes, by melt mixing the components II.a and II.b. The mixing is conducted in a mixing unit having a good kneading action, for example, a twin-screw compounder, at temperatures which depend on the melting points of the components II.a and II.b, generally at temperatures between 230° and 330° C. The components II.a and II.b are used in a weight ratio 40 to 90:60 to 10, preferably 60 to 80:40 to 20.

The preparation of the moulding composition for the layer II can also be carried out in a feed extruder which is used for producing the thermoplastic multilayer composite in the coextrusion or injection moulding facility used. This allows the moulding composition for the layer II to be processed into a layer of the thermoplastic multilayer composite.

Examples of polyolefins are polyethylene and polypropylene. In principle, any commercially available grade of these polyolefins can be used. Examples of suitable is polyolefins are linear polyethylene of high, intermediate or low density; LDPE; ethylene copolymers with relatively small amounts (up to a maximum of about 40% by weight) of comonomers such as n-butyl acrylate, methyl methacrylate, maleic anhydride, styrene, vinyl alcohol or the like; isotactic or atactic homopolypropylene; random copolymers of propene with ethene and/or 1-butene; ethylene-propylene block copolymers; and the like. Such polyolefins can also contain an impact-modifying component such as EPM or EPDM rubber, or SEBS.

Suitable coupling agents for composites of polyolefin and polyamide are known. They are based on polyolefin which is modified with suitable reactive groups. The reactive groups can here be introduced either by copolymerization with the olefin monomer, or by a grafting reaction. In the grafting reaction, a previously prepared polyolefin is reacted in a manner known to one of ordinary skill with an unsaturated, functional monomer and advantageously a free-radical donor at elevated temperature.

Suitable reactive groups are, for example, acid anhydride groups, carboxylic acid groups, epoxide groups, oxazoline groups or trialkoxysilane groups. Of these, acid anhydride groups are preferably used. Particularly suitable coupling agents are those containing from 0.05 to 10% by weight of anhydride groups, and in particular containing from 0.2 to 3% by weight of anhydride groups. When using acid anhydride groups or carboxylic acid groups in order to achieve good adhesion between layers, it is preferable for the polyamide used in layer II to have a certain content of amino end groups, preferably at least 10 mmol/kg, preferably 20–60 mmol/kg, and all values therebetween, of amino end groups based on the weight of the polyamide. Suitable coupling agents are known, inter alia, under the trade names BYNEL (DuPont), PRIMACOR (Dow), POLYBOND (BP), OREVAC (Elf), HERCOPRIME (Hercules), EPOLENE (Eastman), HOSTAMONT (Hoechst), EXXELOR (Exxon) and ADMER (Mitsui Petrochemical).

The moulding compositions for the layers I to IV can have added customary auxiliaries and additives, such as flame retardants, stabilizers, plasticizers, processing aids, viscosity improvers, fillers, particularly those fillers for improving conductivity, pigments or the like. The amount of the specified agents added is to be such that the desired properties are not seriously affected.

The production of the thermoplastic multilayer composites can be carried out in one or more stages. In a single-stage extrusion process, the various melts are coextruded. In the single-stage injection moulding process, the various melts are brought together in a mould and the moulding is allowed to cool (multicomponent injection moulding). In a multistage process, a moulding is first produced from one of the components and is then bonded to the other components by pressing, injection moulding or extrusion.

The thermoplastic multilayer composites of the invention can contain a plurality of each layer I to IV. Furthermore, the thermoplastic multilayer composites of the invention can additionally contain layers other than the layers I to IV. Examples are layers of EVOH or polyamide. For example, a layer of a polyamide moulding composition can be inserted between layers II and III.

The invention also pertains to multilayer composites which contain, in addition to layers I to IV, a regrind layer, i.e. a layer comprising a mixture of the moulding compositions for the layers I to IV. The regrind for such regrind layers is usually obtained by mechanical comminution of corresponding multilayer composites which occur as waste in the production of the multilayer composites and of moulded and finished parts therefrom. The composition in terms of amounts of the regrind then corresponds to the composition of the multilayer composite. However, the regrind can also be mixed with suitable components, for example one of the components I to IV. Composition and position of the regrind layer is selected such that it is firmly bonded to the adjacent layers.

Examples of possible arrangements of layers are shown in Table 1, below.

TABLE 1

Arrangement of layers of thermoplastic multilayer composites of the invention

| Arrangement No. | Sequence |
| --- | --- |
| 1 | Layer I |
|  | Layer II |
|  | Layer III |
|  | Layer IV |
| 2 | Layer I |
|  | Layer II |
|  | Layer III |
| 3 | Layer I |
|  | Layer II |
|  | Layer III |
|  | Layer IV |
|  | Layer III |
|  | Layer II |
| 4 | Layer I |
|  | Layer II |
|  | Layer III |
|  | Layer IV |
|  | Layer III |
|  | Layer II |
|  | Layer I |
| 5 | Layer IV |
|  | Layer III |
|  | Layer II |
|  | Layer I |
|  | Layer II |
|  | Layer III |
|  | Layer IV |
| 6 | Layer IV |
|  | Layer III |
|  | Layer II |
|  | Layer I |
|  | Layer II |
|  | Layer III |
| 7 | Layer IV |
|  | Layer III |
|  | Regrind |
|  | Layer III |
|  | Layer II |
|  | Layer I |
|  | Layer II |
|  | Layer III |
| 8 | Layer IV |
|  | Layer III |
|  | Layer of EVOH |
|  | Layer III |
|  | Layer II |
|  | Layer I |
|  | Layer II |
|  | Layer III |
| 9 | Layer I |
|  | Layer II |
|  | Layer of polyamide moulding composition |
|  | Layer III |
|  | Layer IV |

Individual layers of the thermoplastic multilayer composites can be made electrically conductive and have a surface resistance of less than $10^9$ ohm. In the case of hollow articles, these layers are preferably used internally. The layers are made electrically conductive by methods known to those of ordinary skill. For example, up to 15% by weight of conductivity black, carbon fibers, graphite fibers, or the like are added. Metal and metal oxide powders could also be used.

The thermoplastic multilayer composites of the invention have excellent resistance and barrier action in respect of diffusion towards chemical agents, solvents and fuels. Furthermore, the layers are firmly bonded to one another, so that, for example, on thermal expansion or bending of the finished part, no shearing of the various layers from one another occurs. Likewise, the good adhesion between layers is maintained when the composites of the invention are further treated by thermoforming, blow moulding or drawing. It is also possible to produce parts which contain the multilayer composites of the invention superposed a plurality of times (alternately).

The multilayer composites of the invention are used in construction parts, especially the fields of electrical, machine construction and automobile industry wherever, for example, the barrier action of polyvinylidene fluoride is to be combined with the good mechanical properties of polyolefins and polyamides. Furthermore, wherever the disadvantageous properties of the polyamides and polyolefins, such as unsatisfactory UV resistance, insufficient scratch resistance or unsatisfactory chemical resistance, are to be counteracted by coating with polyvinylidene fluoride. Examples of applications are multilayer pipes for the transport of (petrochemical materials, and in the motor vehicle sector for conveying brake, cooling and hydraulic fluids, as well as fuel. The pipes can also be used as supply lines, for example in petrol stations. Another application is drinking water pipes in which the drinking water is to be protected against diffusion of pollutants from the outside. Further applications include hollow articles which can be produced, for example, by coextrusion and a subsequent blow moulding process. These are used, inter alia, as tanks, in particular fuel tanks in the automobile sector, filling ports, in particular fuel filling ports in the automobile sector, and also as housings for filters, in particular fuel filters in the automobile field.

The composites of the invention combine good mechanical properties and good barrier action against diffusion of fuels. They can be used, in particular, in the automobile sector wherever there is a possibility of contact with fuels.

The parameters mentioned were determined by means of the following measurement methods:

The determination of the melt flow index of the polyglutarimides is carried out at 230° C. under a loading of 3.8 kg (DIN 53 735).

The determination of the melt flow index of the polyvinylidene fluorides is carried out at 230° C. under a loading of 5 kg (DIN 53 735).

The determination of the solution viscosity (rel. viscosity $\eta_{rel}$) of the polyamides is carried out using a 0.5% strength by weight m-cresol solution at 25° C. in accordance with DIN 53 727/ISO 307.

To determine the amino end groups, 1 g of the polyamide is dissolved in 50 ml of m-cresol at 25° C. The solution is titrated potentiometrically with perchloric acid.

To determine the carboxyl end groups in the polyamides, 1 g of polycondensate is dissolved at 165° C. in 50 ml of benzyl alcohol under a blanket of nitrogen. The dissolution time is a maximum of 20 minutes. The solution is titrated with a solution of KOH in ethylene glycol (0.05 mol of KOH/l), using phenolphthalein as indicator, until the color changes.

The testing of the mechanical separability at the interface is carried out using a metal wedge (cutting angle: 5 degrees; loading: 2.5 kg), with an attempt being made to separate the material interface to be tested. If separation occurs at the boundary between the components, the adhesion is poor. If, in contrast, the separation occurs completely or partially within one of the two components, good adhesion is present.

EXAMPLES

Having generally described this invention, a further understanding can be obtained by reference to certain specific examples which are provided herein for purposes of illustration only and are not intended to be limiting unless otherwise specified.

Examples denoted by letters are not according to the invention.

A. Component I

PVDF 1: Polyvinylidenefluoride (melt flow index: 13 g/10 min., DYFLOR LE - HÜLS AG).

PVDF 2: Polyvinylidenefluoride (melt flow index: 8.5 g/10 min, DYFLOR EE - HÜLS AG).

B. Component II

The polymers used for the component II.b consist of the building blocks denoted by (i) to (iv) above, with Alkyl and $R_1$ to $R_7$ each being methyl.

Composition of the polymers used in the examples:

|  | P 1 | P 2 | P 3 |
| --- | --- | --- | --- |
| % by weight of (i) | 100 | 20 | 57 |
| % by weight of (ii) | 0 | 70 | 30 |
| % by weight of (iii) | 0 | 4 | 3 |
| % by weight of (iv) | 0 | 6 | 10 |
| Melt flow index [g/10 min] | 0.8 | 0.4 | 0.4 |

The mixtures for the component II were prepared in a twin-screw compounder at a temperature of the composition of 270° C.

I 1: Mixture of
- a: 70 parts by weight of polyamide 12 ($\eta_{rel}$: 2.1; plasticizer content: 0; amino end groups: 40 mmol/kg; carboxyl end groups: 20 mmol/kg; VESTAMID X7296 - HÜAG), and
- b: 30 parts by weight of P1 (polymethyl methacrylate).

I 2: Mixture of
- a: 60 parts by weight of polyamide 12 ($\eta_{rel}$: 2.1; plasticizer content: 15% by weight; amino end groups: 40 mmol/kg; carboxyl end groups: 20 mmol/kg; VESTAMID X7297 - HÜLS AG), and
- b: 40% parts by weight of P2.

I 3: Mixture of
- a: 70 parts by weight of polyamide 12 ($\eta_{rel}$: 2.1; plasticizer content: 0; amino end groups: 40 mmol/kg; carboxyl end groups: 20 mmol/kg; VESTAMID X7296 - HÜLS AG), and
- b: 30 parts by weight of P3.

C. Coupling agents used (component III):

CA 1:

Moulding composition based on polyethylene (LDPE) modified with maleic anhydride so that the moulding composition contains 0.4% by weight of anhydride groups.

CA 2:

Moulding composition based on ethylene-vinyl acetate copolymer modified with maleic anhydride so that the moulding composition contains more than 0.1% by weight of anhydride groups.

CA 3:

Anhydride-modified copolymer of ethylene and propylene; ADMER®- Mitsui.

CA 4:

Anhydride-modified copolymer of ethylene and methyl acrylate; BYNEL® CXAE 374 - DUPONT.

CA 5:

Anhydride-modified polyethylene; BYNEL® CXA 4001 - DUPONT.

D. Polyolefins used (component IV):

PO 1: High density polyethylene (HDPE); MFI (190/5)= 0.8 g/10 min; VESTOLEN A 4042 R - HÜLS AG).

PO 2: High density polyethylene (HDPE); MFI (190/5)= 0.5 g/10 min; VESTOLEN A 5041 R - HÜLS AG).

E. Production of the thermoplastic multilayer composites

Both multilayer pressed plates and multilayer pipes were produced. The production of the pressed plates was carried out in a laboratory press at 270° C. using a pressing time of 5 min. The layer thickness was in each case 1 mm, i.e. two-layer pressed plates had a total thickness of 2 mm, three-layer pressed plates had a thickness of 3 mm and five-layer pressed plates correspondingly had a thickness of 5 mm. The pipes were produced on a laboratory coextrusion unit using a five-layer die (in the production of pipes having less than five layers, the appropriate number of channels remains closed). The barrel temperatures were 250° C. (PVDF 1, PVDF 2, I 1, I 2, I 3) and 220° C. (CA 1, CA 2, CA 3, CA 4, CA 5, PO 1, PO 2). Pipes having an external diameter of 8 mm and a total wall thickness of 1 mm were produced.

TABLE 2

Multilayer pressed plates

| Experiment No. | Sequence of layers | | | | Mechanically separable at the interface after storage | |
|---|---|---|---|---|---|---|
| | I. | II. | III. | IV. | at 23° | in M15* |
| A | PVDF 1 | | | PO 1 | yes, PVDF 1 from PO 1 | yes, PVDF 1 from PO 1 |
| B | PVDF 2 | I 1 | | PO 1 | yes, I 1 from PO 1 and I 1 from PVDF 2 | yes, I 1 from PO 1 and I 1 from PVDF 2 |
| C | PVDF 1 | | CA 3 | PO 2 | yes, PVDF 1 from CA 3 | yes, PVDF 1 from CA 3 |
| D | PVDF 1 | I 3 | | PO 2 | yes, I 3 from PO 2 | yes, I 3 from PO 2 |
| E | PVDF 1 | I 1 | CA 3 | PO 1 | yes, PVDF 1 from I 1 and I 1 from CA 3 | yes, PVDF 1 from I 1 and I 1 from CA 3 |
| 1 | PVDF 1 | I 2 | CA 1 | PO 1 | no | no |
| 2 | PVDF 2 | I 3 | CA 2 | PO 1 | no | no |
| 3 | PVDF 1 | I 2 | CA 3 | PO 1 | no | no |
| 4 | PVDF 1 | I 2 | CA 4 | PO 2 | no | no |
| 5 | PVDF 2 | I 3 | CA 5 | PO 2 | no | no |

*Storage at 23° C. for 5 days in standard fuel M15 (42.5% by volume of isooctane, 42.5% by volume of toluene and 15% by volume of methanol)

TABLE 3

Multilayer pipes

| Experiment No. | Layer structure from outside to inside | Mechanically separable at the interface after storage | |
|---|---|---|---|
| | | at 23° | in M15* |
| F | 0.1 mm PVDF 1<br>0.7 mm PO 1 | yes | yes |
| G | 0.7 mm PO 1<br>0.1 mm CA 1<br>0.2 mm PVDF 1 | yes, CA 1 from PVDF 1 | yes, CA 1 from PVDF 1 |
| H | 0.7 mm PO 1<br>0.1 mm CA 4<br>0.1 mm I 1<br>0.1 mm PVDF 1 | yes, I 1 from PVDF 1 | yes, I 1 from PVDF 1 |
| 6 | 0.2 mm PVDF 1<br>0.1 mm I 2<br>0.1 mm CA 3<br>0.6 mm PO 1 | no | no |
| 7 | 0.7 mm PO 1<br>0.1 mm CA 4<br>0.1 mm I 3<br>0.1 mm PVDF 1 | no | no |
| 8 | 0.6 mm PO 2<br>0.1 mm CA 4<br>0.1 mm I 2<br>0.1 mm PVDF 1<br>0.1 mm I 2 | no | no |

*Storage at 23° C. for 5 days in standard fuel M15 (42.5% by volume of isooctane, 42.5% by volume of toluene and 15% by volume of methanol)

Obviously, additional modifications and variations of the present invention are possible in light of the above teachings. It is therefore to be understood that within the scope of the appended claims, the invention may be practiced otherwise than as specifically described herein.

German Patent application 195 07 026.7 filed Mar. 7, 1995, is hereby incorporated by reference.

What is claimed as new and desired to be secured by Letters Patent of the United States is:

1. A thermoplastic multilayer composite, comprising:

(I) a layer of polyvinylidene fluoride molding composition, (II) a layer directly adjacent to the layer I and comprising a mixture of
 (a) from 40 to 90% by weight of a polyamide, and
 (b) from 10 to 60% by weight of a polyglutarimide, (III) a layer directly adjacent to the layer II and comprising a coupling agent adjacent to the layer II, and (IV) a layer directly adjacent to the layer III and comprising a polyolefin molding composition, with adjacent layers being firmly bonded to one another and wherein component II(b) contains at least the following basic building blocks:
 (i) a maximum of 98.8% by weight of

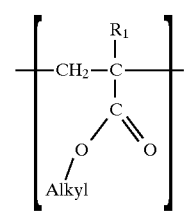

(ii) a maximum of 98.8% by weight of

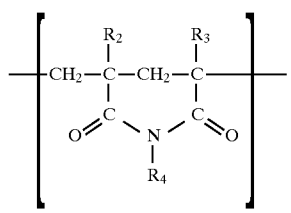

(iii) <20% by weight of

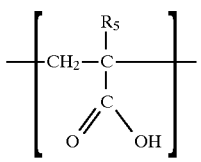

(iv) from 1.2 to 20% by weight of

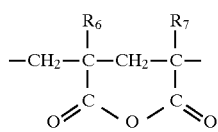

wherein Alkyl is selected from the group consisting of methyl, ethyl, propyl, butyl, pentyl and hexyl; and $R_1$ to $R_7$ are each, independently, $C_nH_{2n+1}$ with n=0 to 6.

2. The thermoplastic multilayer composite of claim 1, wherein layer I comprises a molding composition wherein said polyvinylidene fluoride has a melt flow index of <17 g/10 min.

3. The thermoplastic multilayer composite of claim 1, wherein layer I comprises a molding composition wherein said polyvinylidene fluoride has a melt flow index of from 2 to 13 g/10 min.

4. The thermoplastic multilayer composite of claim 1, wherein the polyvinylidene fluoride molding composition comprises a copolymer of polyvinylidene fluoride.

5. The thermoplastic multilayer composite of claim 1, wherein layer II comprises a mixture of (a) from 60 to 80% by weight of a polyamide, and 5 (b) from 20 to 40% by weight of a polyglutarimide.

6. The thermoplastic multilayer composite of claim 1, wherein component II(b) contains at least the following basic building blocks:

(i) from 10 to 60% by weight of

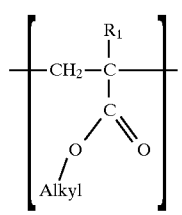

(ii) from 30 to 80% by weight of

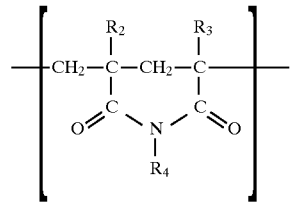

(iii) from 2 to 10% by weight of

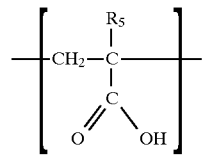

(iv) from 1.5 to 12% by weight of

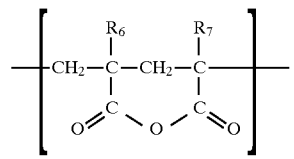

wherein Alkyl is selected from the group consisting of methyl, ethyl, propyl, butyl, pentyl and hexyl; and $R_1$ to $R_7$ are each, independently, $C_nH_{2n+1}$ with n=0 to 6.

7. The thermoplastic multilayer composite of claim 1, wherein component II(b) contains the following basic building block:

(iv) from 2 to 10% by weight of

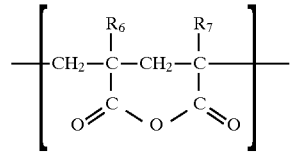

wherein $R_6$ and $R_7$ are $C_nH_{2n+1}$ with n=0 to 6.

8. The thermoplastic multilayer composite of claim 1, wherein Alkyl and $R_1$ to $R_7$ are each a methyl group.

9. The thermoplastic multilayer composite of claim 1, wherein layer IV comprises polyethylene or polypropylene.

10. The thermoplastic multilayer composite of claim 1, wherein the coupling agent of layer III contains a member selected from the group consisting of acid anhydride groups, carboxylic acid groups, epoxide groups, oxazoline groups and trialkoxysilane groups.

11. The thermoplastic multilayer composite of claim 10, wherein the coupling agent of the layer III contains from 0.05 to 10% by weight of anhydride groups.

12. The thermoplastic multilayer composite of claim 11, wherein the polyamide of layer II(a) has an amino end group content of at least 10 mmol/kg.

13. The thermoplastic multilayer composite of claim 10, wherein the coupling agent of layer III contains from 0.2 to 3% by weight of acid anhydride groups.

14. The thermoplastic multilayer composite of claim 1, wherein the polyamide of component II(a) is polyamide 12.

15. The thermoplastic multilayer composite of claim 1, wherein said composite comprises a plurality of at least one of the layers selected from the group consisting of layer I, layer II, layer III and layer IV.

16. The thermoplastic multilayer composite of claim 1, comprising the following layer arrangement:

Layer IV

Layer III

Layer II

Layer I

Layer II

Layer III

Layer IV.

17. The thermoplastic multilayer composite of claim 1, wherein said composite is a molding.

18. The thermoplastic multilayer composite of claim 1, wherein said composite is a hollow profile.

19. The thermoplastic multilayer composite of claim 1, wherein said composite is a multilayer pipe.

20. The thermoplastic multilayer composite of claim 1, wherein said composite is a filling port, tank or fuel filter for a motor vehicle.

21. A thermoplastic multilayer composite, comprising:

(I) a layer of a polyvinylidene fluoride molding composition, (II) a layer directly adjacent to the layer I and comprising a mixture of (a) from 40 to 90% by weight of a polyamide, and (b) from 10 to 60% by weight of a polyglutarimide, (III) a layer directly adjacent to the layer II and comprising a coupling agent and a polyolefin molding composition, with adjacent layers being firmly bonded together to one other and wherein component II(b) contains at least the following basic building blocks:

(I) a maximum of 98.8% by weight of

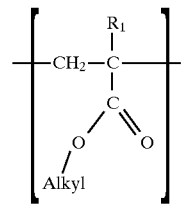

(ii) a maximum of 98.8% by weight of

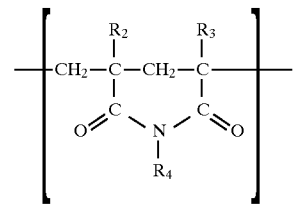

(iii) <20% by weight of

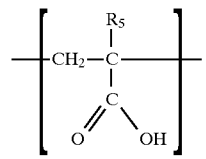

(iv) from 1.2 to 20% by weight of

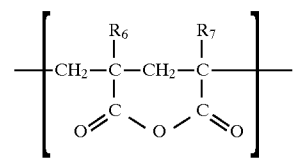

wherein Alkyl is selected from the group consisting of methyl, ethyl, propyl, butyl, pentyl and hexyl; and $R_1$ to $R_7$ are each, independently, $C_nH_{2n+1}$ with n=0 to 6.

* * * * *